(12) United States Patent
Kumagai

(10) Patent No.: US 11,548,363 B2
(45) Date of Patent: Jan. 10, 2023

(54) VEHICLE BATTERY PACK SUPPORT DEVICE

(71) Applicant: Daimler AG, Stuttgart (DE)

(72) Inventor: Naotatsu Kumagai, Kawasaki (JP)

(73) Assignee: Daimler Truck AG, Leinfelden-Echterdingen (DE)

( * ) Notice: Subject to any disclaimer, the term of this patent is extended or adjusted under 35 U.S.C. 154(b) by 7 days.

(21) Appl. No.: 17/255,338

(22) PCT Filed: May 24, 2019

(86) PCT No.: PCT/JP2019/020723
§ 371 (c)(1),
(2) Date: Dec. 22, 2020

(87) PCT Pub. No.: WO2020/003835
PCT Pub. Date: Jan. 2, 2020

(65) Prior Publication Data
US 2021/0362579 A1    Nov. 25, 2021

(30) Foreign Application Priority Data
Jun. 27, 2018    (JP) .............................. JP2018-121589

(51) Int. Cl.
*B60K 1/04*     (2019.01)
*H01M 50/249*   (2021.01)
*H01M 50/262*   (2021.01)

(52) U.S. Cl.
CPC ............ *B60K 1/04* (2013.01); *H01M 50/249* (2021.01); *H01M 50/262* (2021.01); *B60K 2001/0405* (2013.01); *H01M 2220/20* (2013.01)

(58) Field of Classification Search
CPC ............ B60K 1/04; B60K 2001/0405; H01M 50/249; H01M 50/262; H01M 2220/20
See application file for complete search history.

(56) References Cited

U.S. PATENT DOCUMENTS 3,708,028 A * 1/1973 Hafer .................. B60K 1/04
                                                 104/34
4,013,300 A * 3/1977 Berger ................ B60K 15/063
                                                 180/68.5
(Continued)

FOREIGN PATENT DOCUMENTS

CN       108430834 A     8/2018
EP       3 392 091 A1   10/2018
(Continued)

OTHER PUBLICATIONS

PCT/JP2019/020723, International Search Report dated Jul. 30, 2019 (Two (2) pages).
(Continued)

*Primary Examiner* — James A English
*Assistant Examiner* — James J Triggs
(74) *Attorney, Agent, or Firm* — Crowell & Moring LLP

(57) ABSTRACT

A vehicle battery pack support device applicable to various classes of vehicles and allowing weight reduction and cost reduction. The vehicle battery pack support device suspends a battery pack at a side rail constituting a ladder frame of a vehicle and includes a frame-side bracket secured by bolts to an outer side face of the side rail at a plurality of bolt fastening parts thereof arrayed in a grid arrangement. An elastic coupling part elastically couples the battery pack and the frame-side bracket. A spacer is interposed between the outer side face of the side rail and the frame-side bracket. The spacer includes a plurality of columnar members corresponding to the plurality of bolt fastening parts and a connecting part that connects the plurality of columnar members.

6 Claims, 4 Drawing Sheets

(56) References Cited

U.S. PATENT DOCUMENTS

| | | | | |
|---|---|---|---|---|
| 4,357,027 | A * | 11/1982 | Zeitlow | B62D 49/00 |
| | | | | 280/834 |
| 4,365,681 | A | 12/1982 | Singh | |
| 5,593,167 | A * | 1/1997 | Barnhardt | B60R 3/00 |
| | | | | 180/68.5 |
| 7,122,989 | B2 * | 10/2006 | Green | H02N 2/101 |
| | | | | 318/590 |
| 7,350,610 | B2 * | 4/2008 | Kikuchi | H01M 50/20 |
| | | | | 180/68.5 |
| 7,398,849 | B2 * | 7/2008 | Yoshida | B60L 50/60 |
| | | | | 180/68.5 |
| 7,712,563 | B2 * | 5/2010 | Niebuhr | B60L 53/80 |
| | | | | 180/311 |
| 8,517,131 | B2 * | 8/2013 | Kovach | H01M 50/20 |
| | | | | 180/68.5 |
| 8,596,682 | B2 * | 12/2013 | Johnson | B60R 11/06 |
| | | | | 280/834 |
| 11,043,714 | B2 * | 6/2021 | Sloan | H01M 50/20 |
| 2018/0366703 | A1 | 12/2018 | Izumi et al. | |

FOREIGN PATENT DOCUMENTS

| | | |
|---|---|---|
| FR | 2 929 223 A1 | 10/2009 |
| JP | 49-15112 A | 2/1974 |
| JP | 8-324453 A | 12/1996 |
| JP | 11-120975 A | 4/1999 |
| JP | 2004-71281 A | 3/2004 |
| JP | 2010-36901 A | 2/2010 |
| JP | 2016-113063 A | 6/2016 |
| JP | 2017-71253 A | 4/2017 |
| WO | WO 2017/194034 A1 | 6/2017 |

OTHER PUBLICATIONS

English-language European Extended Search Report issued in European application No. 19826469.9-1012 dated Jan. 28, 2022 (Seven (7) pages).

* cited by examiner

VEHICLE BATTERY PACK SUPPORT DEVICE

TECHNICAL FIELD

The present invention relates to a vehicle battery pack support device.

BACKGROUND ART

Development of electrically driven vehicles such as an electric vehicle that uses a motor as a drive power source in place of an engine, i.e., an internal combustion engine, and a hybrid vehicle that uses both the internal combustion engine and motor, has progressed in the prior art in view of environmental impact reduction. These electrically driven vehicles each, in particular, have a drive battery mounted thereon to drive the motor, and, with the battery supplying electric power to the motor, power necessary to run the vehicle is obtained. In recent years, development of such electrically driven vehicles has also progressed in the field of commercial vehicles such as trucks. For example, PTL 1 discloses a retention structure with which a drive battery pack is retained at a ladder frame of an electric truck.

CITATION LIST

Patent Literature

[PTL 1] Japanese Patent Application Publication No. 2016-113063

Summary of Invention

Technical Problem

An electric truck such as the one mentioned above has a larger vehicle weight than a passenger car, hence, the electric truck has to have a large, high-capacity battery pack mounted thereon in order to secure a sufficient travel distance. When the battery pack has a length greater in the vehicle width direction than that of the ladder frame, the battery pack is suspended at the ladder frame by a support device connected to a surface on the outer side of the ladder frame of the vehicle in the vehicle width direction.

However, in such a support device, in order to secure sufficient reliability in supporting a large battery pack, the support device has to be composed of robust components, and this may lead to an increase in weight. Moreover, the distance between side rails of the ladder frame, at which the battery pack is suspended, differs depending on vehicle class, hence, if the support device is to be designed and produced for each vehicle class, the cost of the support device may increase accordingly.

The present invention has been made in view of the circumstance, and an object thereof is to provide a vehicle battery pack support device that is applicable to various vehicle classes and allows weight reduction and cost reduction.

Solution to Problem

The vehicle battery pack support device according to the present, invention is a vehicle battery pack support device for suspending a battery pack at a side rail constituting a ladder frame of a vehicle, and includes: a frame-side bracket secured, by bolts, to an outer side face of the side rail at a plurality of bolt fastening parts arrayed in a grid arrangement; an elastic coupling part elastically coupling the battery pack and the frame-side bracket; and a spacer interposed between the outer side face of the side rail and the frame-side bracket. The spacer includes a plurality of columnar members corresponding to the plurality of bolt fastening parts, and a connecting part connecting the plurality of columnar members.

The vehicle battery pack support device suspends a battery pack at the ladder frame of a vehicle using the frame-side bracket, which is connected to an outer side face of the side rail, and the elastic coupling part. With the spacer, which has a width corresponding to a spacing distance between the side rail and the frame-side bracket, being interposed therebetween, no change in configuration is needed other than that in the spacer even when there are variations in distance between the side rails, depending on vehicle classes.

The spacer is provided with a plurality of columnar members that support bolts, which are fixed to the side rail, around bolt through holes the bolts pass through, and these columnar members are formed as a unified one piece by connecting parts. Therefore, as compared to spacers individually provided to the bolts, process of fixing spacers to each of the side rails can be implemented simpler. Moreover, since the columnar members and connecting parts of the spacer ensure the connection strength with which the heavy battery pack is suspended at the ladder frame, parts other than these can be formed as hollow parts. Accordingly, the vehicle battery pack support device according to the present invention is applicable to various classes of vehicles and allows weight reduction and cost reduction.

DESCRIPTION OF EMBODIMENT

Below, one embodiment of the present invention will be described in detail with reference to the drawings. It should be understood that the present invention is not limited to the contents described below, and can be embodied with suitable modifications as long as the gist thereof is not changed. Moreover, the drawings used for the explanation of the embodiment all provide diagrammatic illustrations of constituent elements with partial exaggeration, enlargement, diminution, omission and the like for the sake of better understanding, hence they may not necessarily precisely represent the scales, shapes and the like of the constituent elements.

Figure 1:
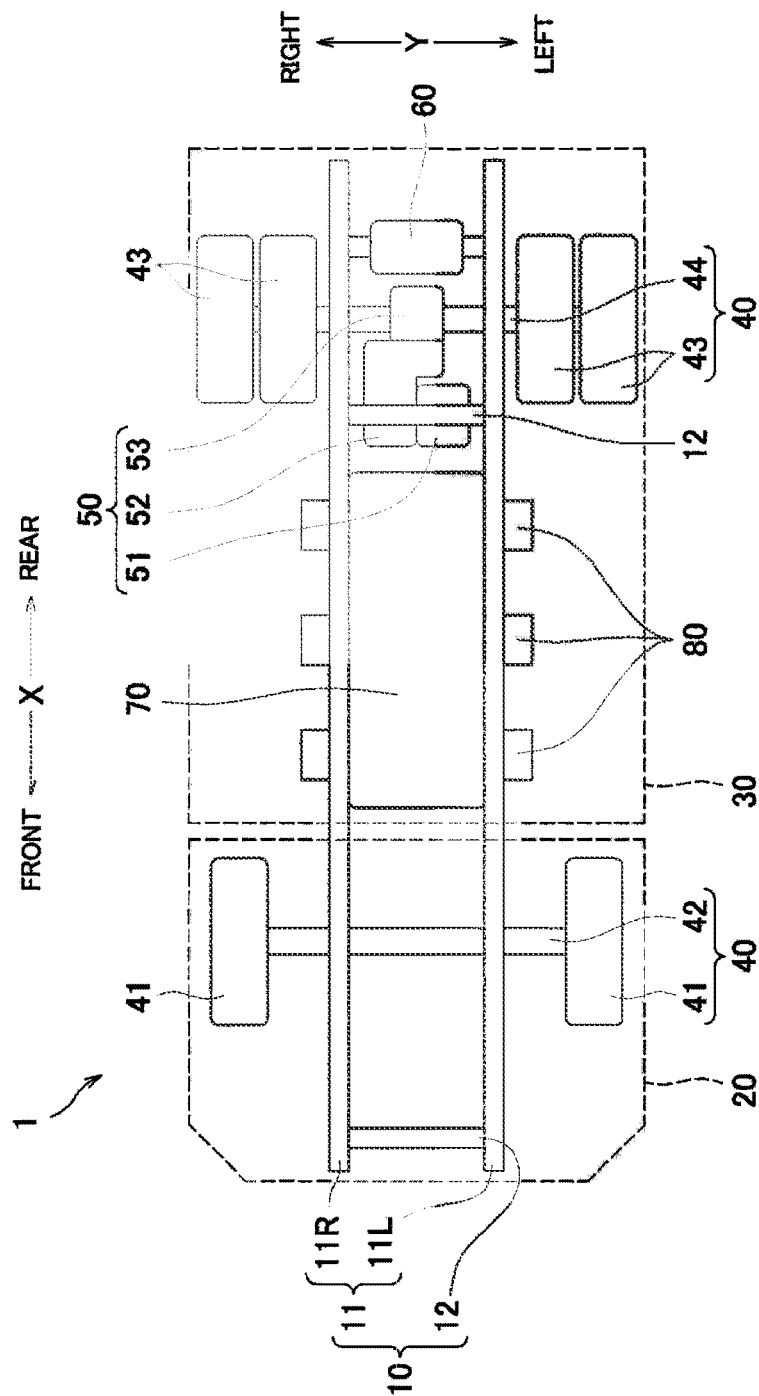
FIG. 1 is a schematic top plan view illustrating an entire configuration of a vehicle on which a vehicle battery pack support device according to the present invention is mounted.

FIG. 1 is a schematic top plan view illustrating an entire configuration of a vehicle 1 on which a vehicle battery pack support device according to the present invention is mounted. As illustrated in FIG. 1, the vehicle 1 according to this embodiment is an electric truck including a ladder frame 10, a cab 20, a cargo box 30, a wheel mechanism 40, a drive unit 50, a drive power supply part 60, a battery pack 70, and a plurality of support devices 80 as "vehicle battery pack support devices". Note, FIG. 1 illustrates the vehicle 1 in top plan view as viewed from above and seen through the cab 20 and cargo box 30.

Although the vehicle 1 in this embodiment is assumed to be an electric car equipped with an electric motor (motor 51 to be described later) as the drive power source, the vehicle may be a hybrid car that additionally includes an engine. Moreover, the vehicle 1 is not limited to an electric truck but may be another commercial vehicle equipped with a battery that drives the vehicle, such as an electric garbage truck.

The ladder frame 10 has side rails 11 and a plurality of cross members 12. The side rails 11 extend along a front to back direction X of the vehicle 1 and include a left side rail 11L and a right side rail 11R that are arranged parallel to each other side by side in the vehicle width direction Y. The plurality of cross members 12 connect the left side rail 11L and right side rail 11R. Namely, the ladder frame 10 configures a frame known as a ladder type. The ladder frame 10 supports the cab 20, cargo box 30, drive unit 50, drive power supply part 60, battery pack 70, and other heavy goods loaded on the vehicle 1.

The cab 20 is a structure including a driver's seat (not shown) that is provided above a front part of the ladder frame 10. The cargo box 30, on the other hand, is a structure loaded with cargo or the like transported by the vehicle 1, and provided above a rear part of the ladder frame 10.

The wheel mechanism 40 is composed of left and right front wheels 41 positioned in the front part of the vehicle, a front axle 42 that is the axle of the two front wheels 41, two rear wheels 43 on left and right positioned in the rear part of the vehicle, and a rear axle 44 that is the axle of the rear wheels 43. In the vehicle according to this embodiment, the drive force is transmitted such that the rear wheels 43 function as drive wheels to cause the vehicle 1 to run. The wheel mechanism 40 is suspended at the ladder frame 10 via a suspension mechanism (not shown) and supports the weight of the vehicle 1.

The drive unit 50 has a motor 51, a reduction gear 52, and a differential gear 53. The motor 51 generates a drive force necessary for causing the vehicle 1 to run, with an alternate alternating current supplied from the drive power supply part 60 to be described later. The reduction gear 52 includes a plurality of gears (not shown), and outputs the rotational torque input from the motor 51 to the differential gear 53 at a reduced rate. The differential gear 53 distributes the power input from the reduction gear 52 to left and right rear wheels 43. Namely, the drive unit 50 transmits the drive power to the rear axle 44 by reducing the drive torque from the motor 51 to a rotation speed suitable for the vehicle to run via the reduction gear 52 and differential gear 53. The drive unit 50 thus allows the rear wheels 43 to rotate via the rear axle 44 to enable the vehicle 1 to run.

The drive power supply part 60 is a device known as an inverter, which delivers power from the battery pack 70 to the motor 51 by converting a direct current to an alternating current, and controls the rotational speed of the motor 51 in accordance with the operation of the acceleration pedal of the vehicle 1.

The battery pack 70 is a rechargeable battery that supplies electric power to the motor 51 as an energy source for causing the vehicle 1 to run. The battery pack 70 includes a plurality of relatively large and high-capacity battery modules not shown) inside to store electric power required for the vehicle 1. Here, the battery pack 70 in this embodiment is arranged to extend over the space between the left side rail 11L and the right side rail 11R and below the side rails 11, and has an inverted T-shaped cross section in a plane vertical to the front to back direction of the vehicle X.

The support device 80 is a connecting member for suspending the battery pack 70 at the ladder frame 10, as will be described later in detail. In this embodiment, three each support devices 80 (total of six) are provided on both sides in the vehicle width direction Y of the ladder frame 10. Note, the number of the support devices 80 may be changed as suited in accordance with the weight and size of the battery pack 70.

Figure 2:
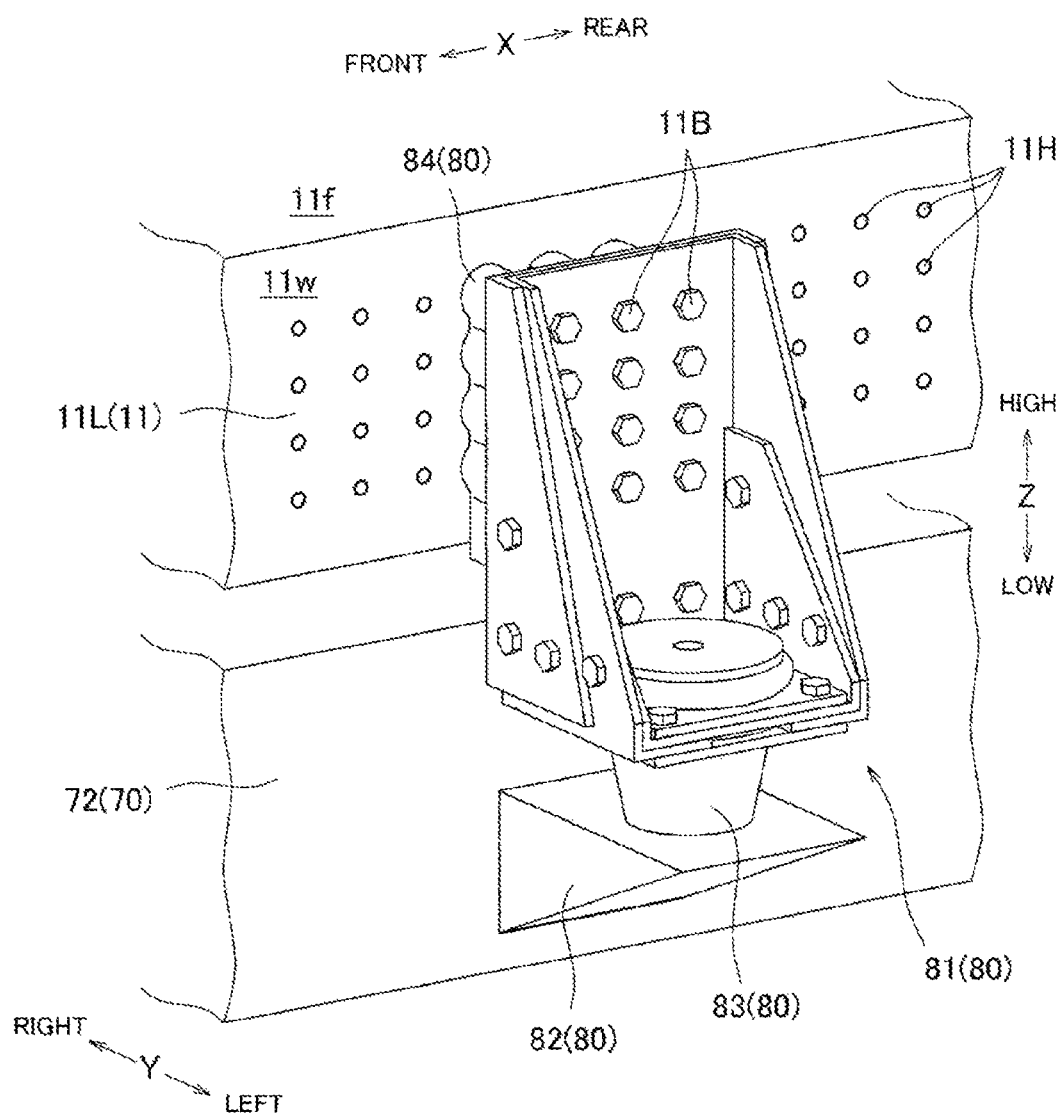
FIG. 2 is a perspective view illustrating a configuration and a form of connection of the support device that connects a side rail and the battery pack.

FIG. 2 is a perspective view illustrating a configuration and a form of connection of the support device 80 that connects the side rail 11 and the battery pack 70. FIG. 2, more particularly, is a perspective view of one support device 80 connected to the left side rail 11L as viewed diagonally from front left of the vehicle 1.

Here, the side rail 11 has a shape in which a web $11w$ forming a flat surface vertical to the vehicle width direction Y is continuous with two flanges $11f$ forming flat surfaces vertical to a vehicle height direction Z. The web $11w$ includes bolt fastening parts 11H formed as through holes in a grid arrangement for allowing bolts 11B to be fastened to suspend various heavy goods at the vehicle 1.

The support device 80 includes a frame-side bracket 81, a battery-side bracket 82, an elastic coupling part 83, and a spacer 84.

The frame-side bracket 81 is a metal member to be connected to an outer side face of the side rail 11, i.e., the web $11w$, with a plurality of bolts 11B. Namely, the frame-side bracket 31 is connected to the outer side face of the side rail 11 via the spacer 84 in a flat surface part vertical to the vehicle width direction Y. The frame-side bracket 31 is also connected to the elastic coupling part 83 in a flat surface part vertical to th vehicle height direction Z.

The battery-side bracket 82 is a metal member connected to an outer side face in the vehicle width direction Y of the battery pack 70 for suspending the battery pack 70 on the outer side of the side rail 11 in the vehicle width direction Y.

The elastic coupling part 83 elastically connects vertically the frame-side bracket 81 and the battery-side bracket 82 in the vehicle height direction Z and includes a part known as a rubber bushing that absorbs the stress caused by the relative displacement therebetween.

The spacer 84 is a metal member to be interposed between the side rail 11 and the frame-side bracket 31 when their connecting surfaces are spaced apart. Therefore, if the side rail 11 and the frame-side bracket 31 are not spaced apart, the spacer 84 is not necessary.

As described above, the battery pack 70 in the vehicle 1 of this embodiment is suspended at the side rails 11 by the support devices 80 including the battery-side bracket 82, elastic coupling part 83, frame-side bracket 81, and spacer 84. Therefore, even when the side rails 11 are subjected to stresses caused by torsion and deflection as the vehicle 1 runs, the elastic coupling part 83 can reduce the risk of such stresses being transmitted to the battery pack 70 with its dampening effect.

Figure 3:
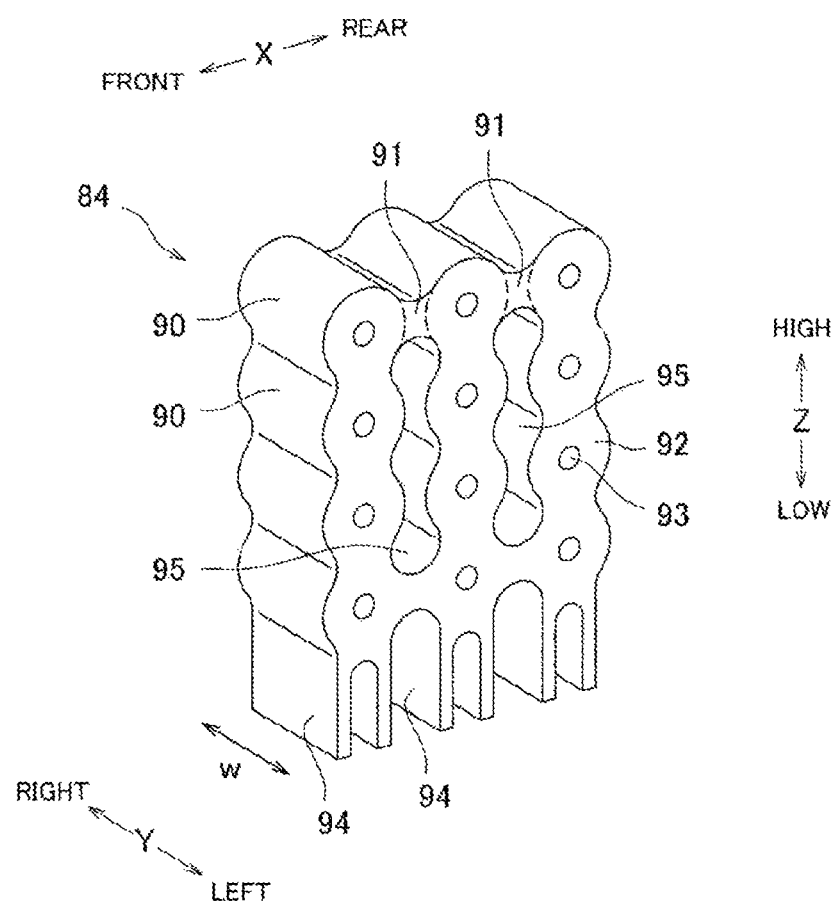
FIG. 3 is a perspective view indicating the structure of a spacer in the support device.

FIG. 3 is a perspective view indicating the structure of the spacer 34 in the support device 80. More particularly, FIG. 3 illustrates the full view of the spacer 84, which is only partly visible in FIG. 2.

The spacer 84 includes a plurality of columnar members 90, a plurality of connecting parts 91, and a plurality of lower extensions 94, with these components being integrally formed by aluminum extrusion, for example.

The plurality of columnar members 90 are aligned in the X-Z plane at intervals corresponding to the intervals of the plurality of bolt fastening parts 11H formed in the web 11w of the side rail 11 in a grid arrangement. Here, in chic embodiment, there are three columnar members 90 along the longitudinal direction of the vehicle X and four columnar members along the vehicle height direction Z in a matrix arrangement. The number and arrangement of the plurality of columnar members are not limited to this and may be changed suitably in accordance with various conditions.

The plurality of connecting parts 91 are connecting portions that allow for integral formation of the plurality of columnar members 90, and each of the connecting parts 91 connects two columnar members 90 adjacent each other in the longitudinal direction of the vehicle X and in the vehicle height direction Z. Note, the plurality of connecting parts 91 only need to connect all the columnar members 90 of the spacer 84 together, and two adjacent columnar members 90 need not necessarily be connected directly. Accordingly, there are formed hollow parts 95 in the spacer 84 among the plurality of connecting parts 91.

The lower extensions 94 are parts that extend downward in the vehicle height direction from the columnar members 90 arranged lowermost in the vehicle height direction Z and define the height of the bottom surface of the spacer 84. The erects of the lower extensions 94 will be described later.

The plurality of columnar members 90 each include a circular bolt end surface 92 on the end face in the vehicle width direction Y, and a bolt through hole 93 at the center of the bolt end surface 92 extending through in the vehicle width direction Y. This allows the spacer 84 to be sandwiched between the side rail 11 and the frame-side bracket 81 from both sides in the vehicle width direction Y, with bolts 11B passing through the bolt through holes 93 integrally fixing them together.

Since the spacer 84 is formed by aluminum extrusion, for example, as mentioned above, the width W the vehicle width direction Y can be readily adjusted in accordance with the spacing between the side rail 11 and the frame-side bracket 81. Even when there are variations in this spacing, the width W can be determined by the position of cutting the extrusion-molded aluminum, which allows for common use of metal molds for forming spacers 84.

The spacer 84, by supporting the bolts 11B between the side rail 11 and the frame-side bracket 81, helps increase the reliability to withstand the stress applied to the bolts 11B caused by the weight of the battery pack 70. Moreover, parts of the spacer 84 that are redundant in terms of improvement of reliability are formed as hollow parts 95, so that a weight reduction can be achieved.

Figure 4:
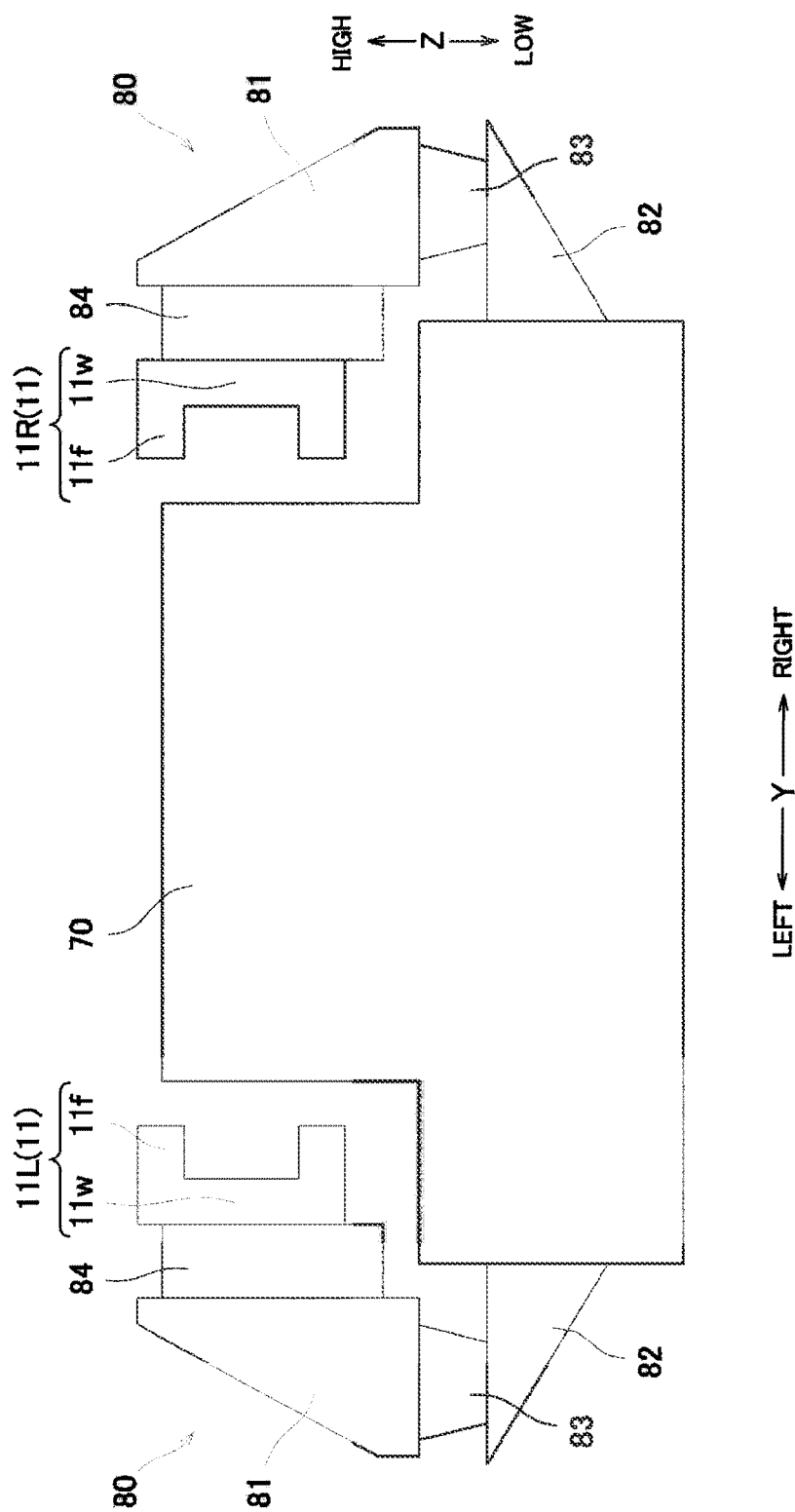
FIG. 4 is a schematic rear view illustrating a form of connection of the support device that connects the side rail and the battery pack.

FIG. 4 is a schematic rear view illustrating a form of connection of the support device 80 that connects the side rail 11 and the battery pack 70. More particularly, FIG. 4 presents a diagrammatic plan view of the battery pack 70 suspended at the side rails 11 by the support devices 80 as viewed from the back in the longitudinal direction of the vehicle X.

The battery pack 70 mounted on the vehicle 1 is suspended at the side rails 11 using the battery-side brackets 82, elastic coupling parts 83, frame-side brackets 81, and spacers 84, as described above, on both sides in the vehicle width direction Y. Note, the spacing between the left side rail 11B, and the right side rail 11R of the side rails 11 differs depending on the class of the vehicle 1. Therefore, the support device 80 adjusts this spacing by means of the width W in the vehicle width direction Y of the spacer 84.

Here, the frame-side bracket 81 is connected to the side rail 11 in the vehicle width direction Y via the spacer 84 with bolts 11B, and connected to the elastic coupling part 83 below in the vehicle height direction Z. Therefore, stress applied to the spacer 84 and the frame-side bracket 81 concentrates on the shortest path between the side rail 11 and the elastic coupling part 83.

The plurality of columnar members 90 described above of the spacer 84 are connected to the outer side face of the side rail 11 such as to correspond to the plurality of bolt fastening parts 11H formed in the web 11w of the side rail 11. Here, since the lower extensions 94 are formed below the plurality of columnar members 90 in the vehicle height direction Z, the lower extensions 94 of the spacer 84 extend downward further than the bottom surface of the side rails 11 in the vehicle height direction Z. Therefore, the lower extensions 94 provided in parts where stress concentrates allow the spacer 84 to have an increased durability against the stress.

As described above, the support device 80 according to the present invention is provided with a spacer 84 having a width W in accordance with the spacing distance between the outer side face of the side rail 11 and the frame-side bracket 81 for suspending the battery pack 70 at the side rails 11 of the vehicle. Therefore, even when there are variations the spacing between the left side rail 11L and the right side rail 11R for various vehicle classes, it is not necessary to design and produce support devices 80 by taking the variations into account, hence costs can be reduced.

Moreover, the spacer 84 of the support device 80 according to the present invention includes a plurality of columnar members 90 connected together by connecting parts 91, while redundant parts in terms of the support of weight of the battery pack 70 are formed as hollow parts 95, which allows we t reduction and cost reduction.

Moreover, the spacer 84 of the support device 80 according to the present invention is formed by extrusion molding, for example, and this allows a metal mold to be used in common for formation of a variety of widths W, enabling a reduction in design and production costs. Accordingly, the vehicle battery pack support device 80 according to the present invention is applicable to various classes of vehicles and allows weight reduction and cost reduction.

While one embodiment has been described above, the present invention is not limited to the embodiment described above. For example, the spacer 84 is described to be formed by extrusion molding in the embodiment above, but other forming methods such as draw forming and casting may be adopted. Moreover, the embodiment described above illustrates one form in which bolts 11B are passed through all the bolt through holes 93 provided to the spacer 84. As long as the reliability of connection to the side rails 11 is ensured, a connecting method that does not use some of the bolt through holes 93 may be applied.

REFERENCE SIGNS LIST

1 Vehicle
10 Ladder frame
11 Side rail
11w Web
11H Bolt fastening part
11B Bolt
70 Battery pack
80 Support device
81 Frame-side bracket
82 Battery-side bracket
83 Elastic coupling part 84 Spacer
90 Columnar member
91 Connecting part

The invention claimed is:

1. A vehicle battery pack support device for suspending a battery pack at a side rail constituting a ladder frame of a vehicle, comprising:
a frame-side bracket securable by bolts to an outer side face of the side rail at a plurality of bolt fastening parts of the outer side face of the side rail which the plurality of bolt fastening parts are arrayed in a grid arrangement;
an elastic coupling part, wherein the battery pack and the frame-side bracket are elastically coupleable by the elastic coupling part; and
a spacer interposable between the outer side face of the side rail and the frame-side bracket,
wherein the spacer has a lower extension in a vehicle height direction, wherein the lower extension extends downward further than a bottom surface of the side rail in the vehicle height direction when the spacer is interposed between the outer side face of the side rail and the frame-side bracket.

2. A vehicle, comprising:
a vehicle battery pack support device, wherein the vehicle battery pack support device suspends a battery pack at a side rail constituting a ladder frame of the vehicle and wherein the vehicle battery pack support device includes:
a frame-side bracket secured by bolts to an outer side face of the side rail at a plurality of bolt fastening parts of the outer side face of the side rail which the plurality of bolt fastening parts are arrayed in a grid arrangement;
an elastic coupling part, wherein the battery pack and the frame-side bracket are elastically coupled by the elastic coupling part; and
a spacer interposed between the outer side face of the side rail and the frame-side bracket,
wherein the spacer has a lower extension in a vehicle height direction, wherein the lower extension extends downward further than a bottom surface of the side rail in the vehicle height direction.

3. The vehicle battery pack support device according to claim 1, wherein the spacer has a plurality of columnar members that correspond to the plurality of bolt fastening parts and a connecting part that connects the plurality of columnar members.

4. The vehicle battery pack support device according to claim 3, wherein a part of the spacer interposable between the outer side face of the side rail and the frame-side bracket is comprised of the plurality of columnar members and the connecting part.

5. The vehicle according to claim 2, wherein the spacer has a plurality of columnar members that correspond to the plurality of bolt fastening parts and a connecting part that connects the plurality of columnar members.

6. The vehicle according to claim 5, wherein a part of the spacer interposed between the outer side face of the side rail and the frame-side bracket is comprised of the plurality of columnar members and the connecting part.

* * * * *